United States Patent [19]

Dosjoub et al.

[11] Patent Number: 4,737,761

[45] Date of Patent: Apr. 12, 1988

[54] FEEDING OF ELECTRICAL ENERGY TO CIRCUITS ON A WHEEL FOR A TIRE-MONITORING DEVICE

[75] Inventors: Andre Dosjoub, Chamalieres; David Myatt, Pompignat, both of France

[73] Assignee: Compagnie Generale des Etablissements Michelin, Clermont-Ferrand, France

[21] Appl. No.: 878,060

[22] Filed: Jun. 24, 1986

[30] Foreign Application Priority Data

Jul. 3, 1985 [FR] France ............... 85 10516

[51] Int. Cl.⁴ .............................. B60C 23/00
[52] U.S. Cl. ...................... 340/58; 340/693; 73/146.4; 73/146.5
[58] Field of Search ............ 340/58, 57, 635, 646, 340/671, 672, 693; 73/146.5, 146.4; 361/37, 170; 116/34 R, 34 A, 34 B

[56] References Cited

U.S. PATENT DOCUMENTS

| | | | |
|---|---|---|---|
| 4,052,696 | 10/1977 | Enabnit | 73/146.5 |
| 4,148,008 | 4/1979 | Lusk et al. | 340/58 |
| 4,389,884 | 6/1983 | Aguilia | 73/146.5 |
| 4,467,641 | 8/1984 | Abraham | 73/146.5 |
| 4,514,645 | 4/1985 | Endo et al. | 340/58 |
| 4,567,459 | 1/1986 | Folger et al. | 73/146.5 |
| 4,578,992 | 4/1986 | Galasko et al. | 73/146.5 |

FOREIGN PATENT DOCUMENTS 0016991 5/1980 European Pat. Off. .
2122757 7/1983 United Kingdom .

*Primary Examiner*—Donnie L. Crosland
*Attorney, Agent, or Firm*—Brumbaugh, Graves, Donohue & Raymond

[57] ABSTRACT

A tire-monitoring device comprises, on a wheel of a vehicle, a converter stage which processes an electric signal representing measurements of the pressure and/or temperature of the tire in pulse form and a stage for transmitting the signal to the vehicle by inductive coupling. In order to minimize the consumption of electric energy by circuit components on the wheel, a solid state switch responsive to the transmission of energy from the vehicle to the wheel disconnects the circuit components on the wheel from the energy source. Also, in order to further minimize the consumption of electrical energy, only the positions of the ascending and descending fronts of the electric signal pulses representing the measurements are transmitted to the vehicle and the transmission coil is connected to the source of energy only when the pulse signals have ascending or descending fronts.

11 Claims, 4 Drawing Sheets

FEEDING OF ELECTRICAL ENERGY TO CIRCUITS ON A WHEEL FOR A TIRE-MONITORING DEVICE

BACKGROUND OF THE INVENTION

The present invention relates to devices for monitoring the condition of tires. More particularly, it relates to systems for feeding energy to the different stages of those of the devices which have an electrical energy supply on the wheel.

The behavior of a tire is complicated; the monitoring cannot be reduced to the mere detection of one or more threshold values. It is therefore important to be able to transmit the measurement of one or more variables observed on the wheel, which is movable in rotation, to the chassis of the vehicle, and this preferably for any angular position of the wheel. When active components are used on the wheel in order to effect the necessary measurements, it is indispensable to provide an energy feed on the wheel. The energy required can be supplied either by a battery or a condenser of sufficient capacitance, charged by any suitable means. An example of the use of a battery is found in the tire-monitoring device proposed in French Patent Application No. 2,529,513. An example of condenser charging is found in European Patent No. 45,401, in which the electrical energy is transmitted from the chassis towards the wheel by inductive coupling between two coils one of which is fastened to the chassis and the other to the wheel.

In a tire-monitoring device of the type having active components, there may be on the wheel an energy storage stage (battery or condenser with its charging means), a converter stage for transforming the value of the variables measured into an electrical signal, and a stage for the transmitting of the signal. This transmission stage is a power stage as compared with the converter stage, that is to say a stage which utilizes a sufficiently large amount of electrical energy to assure the transmission of the signal from the wheel to the chassis, in general by inductive coupling.

Whatever the system employed for the storage of the energy, it is important to minimize the consumption of electrical energy on the wheel as much as possible. This is important if battery feed has been provided in order to avoid having to replace the battery prematurely, and it becomes entirely crucial if the device obtains its energy from a condenser. The conventional precautions used up to the present time are limited in most cases to using components of low energy consumption, for instance, those utilizing CMOS technology.

SUMMARY OF THE INVENTION

The object of the present invention is to assure as rational as possible a use of the energy available on the wheel.

A first object of the invention is to permit an optimal charging as rapidly as possible of a condenser which serves as energy storage when it is charged by electric energy sent from the chassis of the vehicle to the wheel by inductive coupling.

According to the invention, a system for feeding energy to electric circuits fastened to a wheel in a device for monitoring tires of a vehicle, the transmission of energy from the chassis of the vehicle to the wheel being effected by inductive coupling between two coils, one connected to the chassis and the other to the wheel, the storage of the energy being effected by at least one condenser fed by the coil connected to the wheel via a rectifier, the condenser feeding the electric circuits with energy, is characterized by the fact that the system comprises means responsive to the transmission of energy from the chassis to the wheel for disconnecting said circuits from said condenser.

In a second object of the invention, whatever the means of storing the electrical energy but in the event that the signal to be transmitted is of pulse type, it is sought to assure the transmission of the signal with the consumption of the least possible energy. By "pulse signal" there is understood a rectangular wave whose "parameters" bearing the measurements of the variables observed are the width of the period during which this signal is in high state and the width of the period during which this signal is in low state, or else one of these two widths and the cyclic ratio of the signal.

According to the invention, a system for feeding energy to a coil fastened to a wheel in a device for monitoring tires of a vehicle, the electrical energy necessary being accumulated by storage means, the monitoring device having a converter stage which serves for detection and coding in the form of a pulse signal of the value of at least one measured variable, the device furthermore comprising a stage for the transmission of the pulse signal based on the inductive coupling between two coils, one fastened to the wheel and the other to the chassis of the vehicle, is characterized by the fact that the transmission stage comprises means for connecting the storage means to the coil connected to the wheel when the pulse signal has an ascending front or a descending front and disconnecting the storage means at all other times

DESCRIPTION OF THE DRAWINGS

The accompanying drawings will make it possible to understand more clearly the invention and comprehend all the advantages thereof.

DETAILED DESCRIPTION OF THE INVENTION

Figure 1:
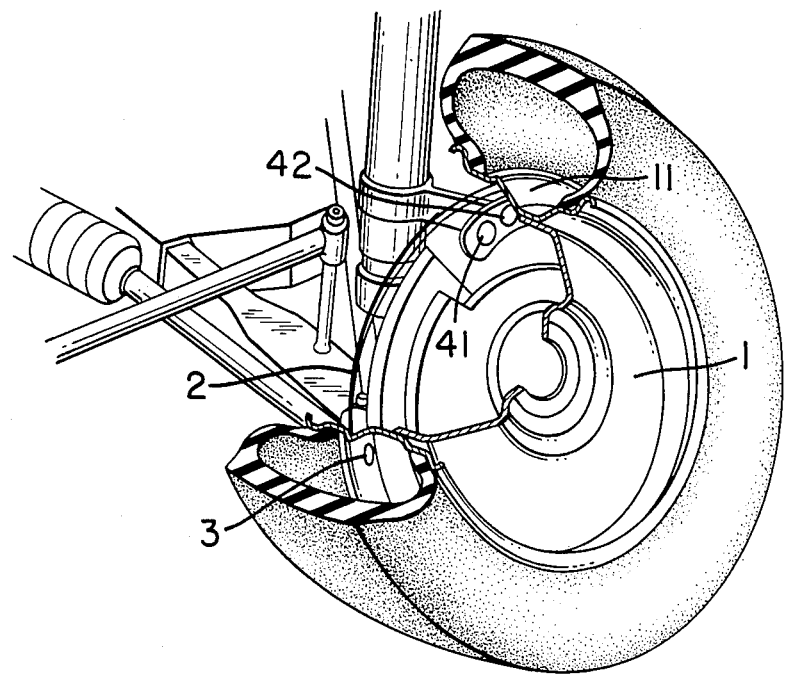
FIG. 1 shows schematically the location of a tiremonitoring device.

FIG. 1 illustrates, in non-limitative fashion, the location of the parts of a monitoring device in connection with which there is provided on the wheel 1 a coil 2 which is concentric to the wheel 1, a unit arranged in a housing 3 comprising at least one condenser in order to accumulate electrical energy transmitted from the chassis of the vehicle by inductive coupling, a converter stage and a transmission stage connected to the same coil. On the non-rotating part are disposed either a single coil serving both for the transmission of electrical energy towards the wheel and for the reception of the coded signal received from the wheel, or two coils, one 41 serving for the transmission of energy and the other 42 for the reception of the signal. The tolerances with respect to the positioning of the coils are rather large. However, it is indispensable that the coil 2 be concentric to the wheel 1 so that the coupling is not a function of the angular position of the wheel 1.

Figure 2:
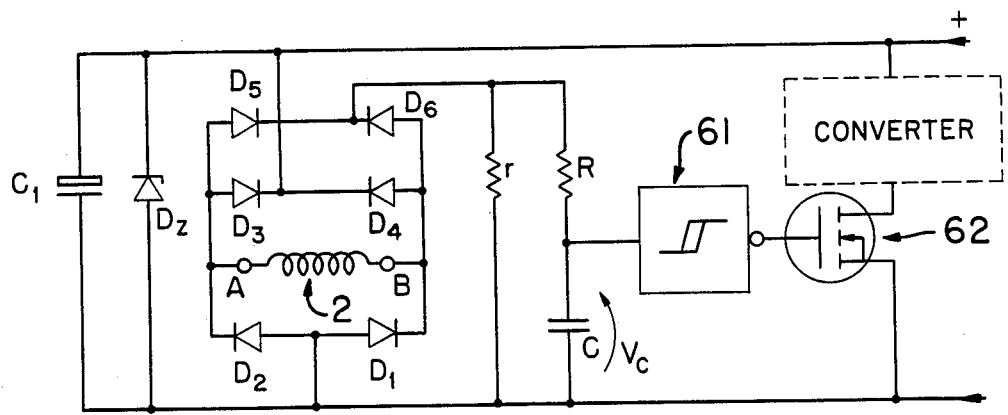
FIG. 2 is a synoptic diagram of one embodiment of the invention.

FIG. 2 shows the coil 2 connected between the points A and B, a first rectifier bridge $D_1$, $D_2$, $D_3$ and $D_4$, a zener diode $D_Z$ and a condenser $C_1$ of large capacitance, for instance 100 $\mu F$, intended to serve as electric energy storage. The rectifier bridge $D_1$, $D_2$, $D_5$ and $D_6$ feeds an RC branch of very low time constant as compared with the charging time constant of the condenser $C_1$. A branch containing the resistor r permits the discharge of the condenser C of the RC branch. A comparator 61 makes it possible to detect the charge or discharge condition of the condenser C. The comparator 61 actuates switch means, for instance a field-effect transistor 62, for connecting or disconnecting the electric circuits arranged in the wheel 1. In this example, the circuits comprise a coding circuit for delivering a pulse signal and being in the form of a converter stage, such as the one described in the applicants' French Patent Application No. 85/10515 (corresponding to U.S. application Ser. No. 877,844, filed June 24, 1986. The pulse signal transmission stage may be like that schematically indicated in FIG. 4.

Figure 2A:
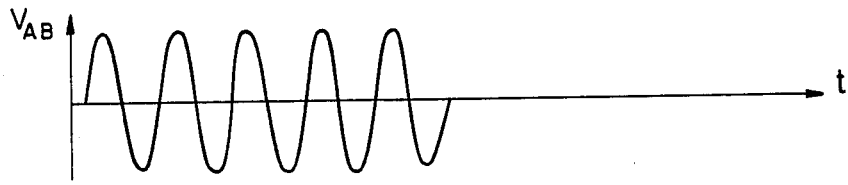
FIGS. 2a to 2d show time diagrams of the principal signals, serving to explain the operation of the circuit of FIG. 2.
Figure 2B:
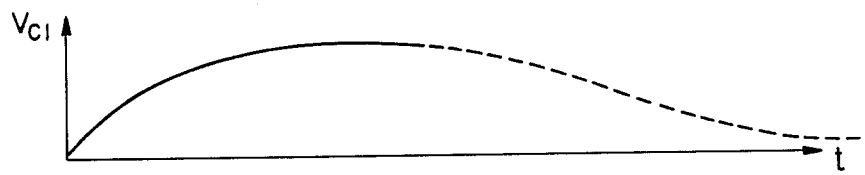
Figure 2C:
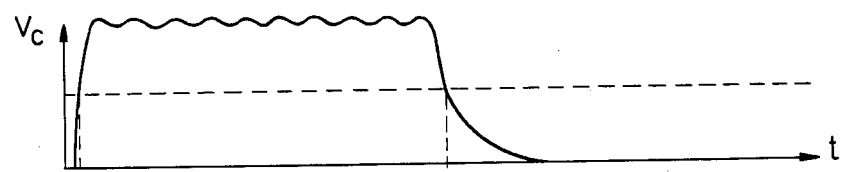
Figure 2D:
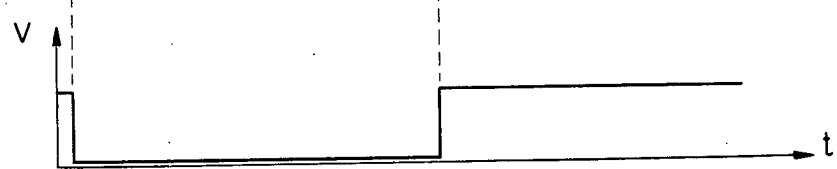

FIG. 2a shows the signal $V_{AB}$ available at the terminals of the coil 2. This is, for instance, a 20 kHz sinusoidal signal induced in the coil 2 from a source on the chassis of the vehicle. FIG. 2b shows the voltage $V_{C1}$ available at the terminals of the condenser $C_1$ after rectification and clipping by the zener diode $D_z$. FIG. 2c shows the voltage $V_C$ observed by the comparator 61. The RC circuit is characterized by a small time constant and the electric wave has a strong rate of undulation. When the voltage $V_C$ exceeds a given reference threshold set in the comparator 61, the comparator causes the field-effect transistor 62 to block during the phase of the charging of the condenser $C_1$. A two-pole transistor can be used as a substitute for the comparator 61. Due to this feed system, the consumption of electrical energy in the wheel circuits during the energy transmission phase is avoided. In fact, it is easier to process the pulse signal when it is received during a period in which no energy is being transmitted, since the superimposition of electrical signals is thus avoided. If the measurement-bearing pulse signal is not processed during the transmission of energy, the energy consumed by a coding circuit and a transmission stage would be a pure loss, which would needlessly delay the time when the condenser $C_1$ would reach maximum charge.

Figure 3:
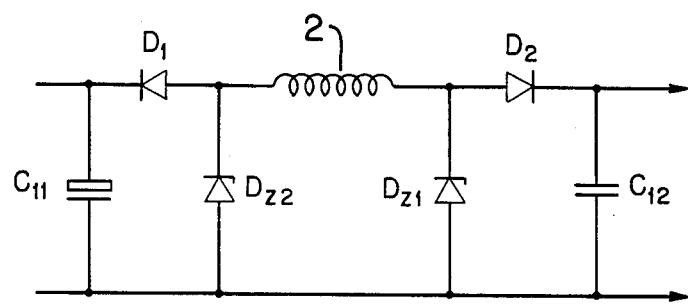
FIG. 3 shows a variant embodiment of the circuit shown in FIG. 2.

FIG. 3 shows a variant embodiment of the circuit described above in which the electrical energy is stored in two condensers, one $C_{11}$ (of large capacitance, for instance several tens of $\mu F$) intended to feed the analog components of the electric circuit mounted on the wheel 1, and the other $C_{12}$ (of a capacitance on the order of n F, which assures the rapid charging thereof) intended to feed the stage or stages of logic which assure the control of the electric circuit. The charging of the condenser $C_{11}$ is assured by a single alternation rectification due to the diode $D_1$ and the zener diode $D_{Z1}$. Similarly, the charging of the condenser $C_{12}$ is assured by the diode $D_2$ and the zener diode $D_{Z2}$. The clipping of the voltage of each of the condensers $C_{11}$ and $C_{12}$ is assured by the zener diode of the rectifier charging the other condenser, by $D_{Z2}$ and $D_{Z1}$, respectively. The detection of the energy transmission phase is effected in a manner similar to that which has been described above and it is needless to repeat the description of it here.

Figure 4:
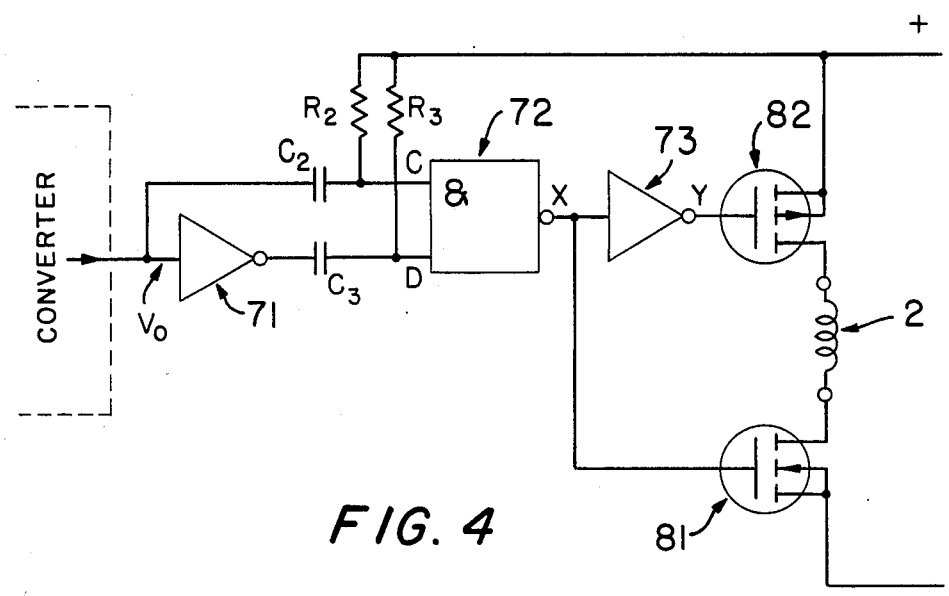
FIG. 4 shows a synoptic diagram of another embodiment of the invention.
Figure 4A:
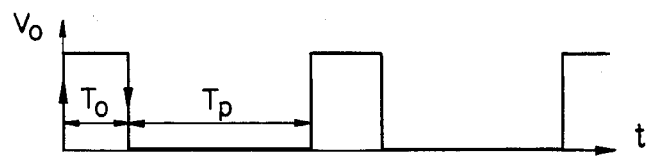
FIGS. 4a to 4e are time diagrams of the principal signals, serving to explain the operation of the circuit of FIG. 4.
Figure 4B:
Figure 4C:
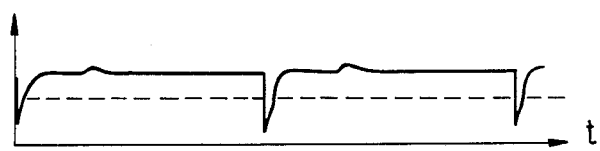
Figure 4D:
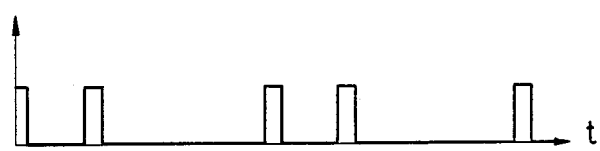
Figure 4E:
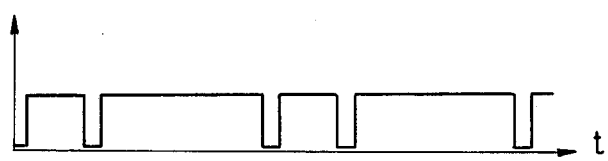

The feed system of the transmission stage shown in FIG. 4. illustrates another application of the principle of the suppression of all needless consumption of energy. The converter stage is connected to a branch $R_2C_2$ as well as to an invertor 71, the latter also being connected to a branch $R_3C_3$. A "NAND" gate 72 receives the signals available at the points C (FIG. 4b) and D (FIG. 4c), these signals being the derivative of the pulse signal $V_o$ delivered by the converter (see FIG. 4) and the derivative of the inverted pulse signal respectively, both offset along the ordinate axis of the value of the feed voltage. The peaks which tend to exceed the feed voltage are however clipped by the zener diode (see FIG. 2). The dashed lines in FIGS. 4b and 4c represent the level of detection by the "NAND" gate 72. The "NAND" gate 72 delivers a signal for driving switching means for connecting and disconnecting the coil 2 to and from the electric energy storage means, namely a battery or, as in this example, a condenser. The switching means may be formed of field-effect transistors one of which 81 is controlled by the output signal of the "NAND" gate 72 (FIG. 4d) and the other 82 by this same signal inverted (FIG. 4e) by the invertor 73. Two-pole transistors can also be used in place of the transistors 81 and 82. In the configuration shown in FIG. 2, the rectification diodes $D_1$, $D_2$, $D_3$, $D_4$ also constitute, together with the condenser $C_1$ and the zener diode $D_Z$ (see FIG. 2) a means for eliminating overvoltages upon interruption of the current in the coil 2.

The pulse signal $V_o$ bears, in coded form, the value of the variable or variables measured in the tire. In the event that the converter stage is a coding circuit in accordance with the above-mentioned French Patent Application No. 85/10515, the temperature is represented by the pulse width ($T = K_1 T_o$) and the pressure by the cyclic ratio $$\left( p = K_2 \frac{T_o}{T_p} \right)$$

It is therefore necessary to measure time intervals. It is therefore sufficient to transmit from the wheel to the chassis the positions of the ascending fronts and the position of the descending fronts. By taking suitable measures to insure that the period $T_p$ is always greater than the period $T_o$, the decoder on the vehicle can be synchronized, even if the position of each front is transmitted in the same manner. For this reason, the energy feed system in accordance with the invention provides for connecting the condenser to the coil for just the amount of time necessary to transmit the position of each front of the signal $V_o$. This transmission stage must cause the appearance at the terminals of the coil 2 of an electric wave of large power so that the coded signal can be induced at a sufficient level in the coil 42 connected to the chassis of the vehicle, and it achieves this purpose with the consumption of a minimum amount of energy; there is substantial consumption only upon each occurrence of a front and not for the entire duration of the period $T_o$. Since the pulses transmitted are all of the same polarity, they will be detected at the level of the decoder on the vehicle by the electronic component itself. One therefore avoids the disturbing influence of manufacturing dispersions, which constitutes another advantage of the system of the invention.

Figure 5:
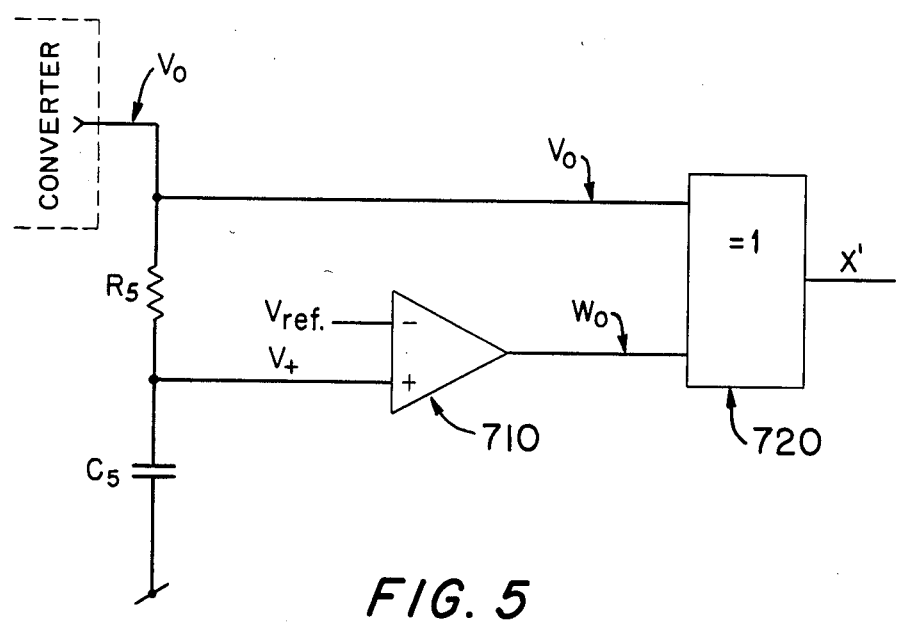
FIG. 5 shows a variant embodiment of the circuit shown in FIG. 4.
Figure 5A:
FIGS. 5a to 5d are time diagrams of the principal signals, serving to explain the operation of the circuit shown in FIG. 5.
Figure 5B:
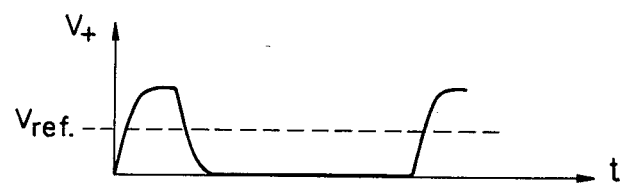
Figure 5C:
Figure 5D:
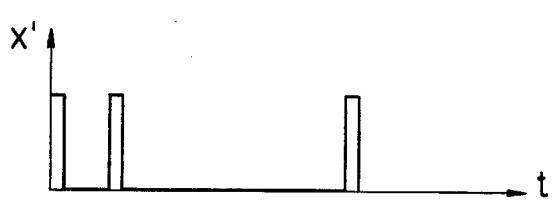

As a variant, the transmission of the fronts (ascending and descending) of the pulse signal $V_o$ delivered by the converter can take place in the manner shown in FIGS. 5, 5a, 5b, 5c and 5d. The signal $V_o$ (FIG. 5a) is applied to the branch $R_5C_5$. The comparator 710 receives at the inverting output a reference voltage $V_{ref}$ and at the non-inverting input a voltage $V_+$ the time diagram of which is shown in FIG. 5b. The comparator 710 delivers a signal $W_o$ such as shown in FIG. 5c, of the same shape as $V_o$ but shifted in phase. The delay of the signal $W_o$ with respect to the signal $V_o$ is a function of the selection of the elements $R_5$ and $C_5$, which must be such that this delay is substantially less than the width $T_o$ of one pulse of $V_o$. An "EXCLUSIVE-OR" gate 720 receives, on the one hand, $V_o$, and, on the other hand, $W_o$ and delivers a signal $X'$ of high level only when one or the other (but not both at the same time) of the signals $V_o$ or $W_o$ is in the high state. This signal $X'$ lends itself to controlling switching means such as the transistors 81 and 82 (FIG. 4).

The specific embodiments described above are only illustrative and the invention is intended to encompass all modifications in form and detail coming within the scope of the following claims.

What is claimed is:

1. A system for feeding energy to electric circuits fastened to a wheel in a device for monitoring tires of a vehicle, the transmission of energy from the chassis of the vehicle to the wheel being effected by inductive coupling between two coils, one connected to the chassis and the other to the wheel, the storage of the energy being effected by at least one condenser fed by the coil connected to the wheel via a rectifier, the condenser feeding the electric circuits with energy, characterized by the fact that the system comprises means responsive to the transmission of energy from the chassis to the wheel for disconnecting said circuits from said condenser.

2. A system for feeding energy according to claim 1, characterized by the fact that the means comprise an RC branch of very low time constant, the branch being fed by the coil connected to the wheel via a rectifier, a resistive branch permitting the discharge of the condenser of the RC branch, a comparator for detecting the state of charge of the condenser of the RC branch, and switch means actuatable by said comparator in response to the state of charge of the condenser of the RC branch for connecting or disconnecting said circuits from said condenser.

3. A system for feeding energy according to claim 1 or 2, characterized by the fact that the storage of the energy is effected by two condensers one of which feeds logic stages in the electric circuits and the other feeds analog components of said circuits.

4. A system for feeding energy according to claim 3, characterized by the fact that zener diode means are provided for clipping the voltages of each of said two condensers, said zener diode means also serving as a rectifying element for the charging of at least one of said two condensers.

5. A system for feeding energy to a coil fastened to a wheel in a device for monitoring tires of a vehicle, the electrical energy necessary being accumulated by storage means, the monitoring device having a converter stage which serves for detection and coding in the form of a pulse signal of the value of at least one measured variable, the device furthermore comprising a stage for the transmission of the pulse signal based on the inductive coupling between said coil and another coil fastened to the chassis of the vehicle, characterized by the fact that the transmission stage comprises switching means responsive to said pulse signal for connecting the storage means to the coil connected to the wheel when the pulse signal has an ascending front or a descending front and disconnecting the storage means at all other times.

6. A system for feeding energy according to claim 5, characterized by the fact that the connecting means comprise a "NAND" gate responsive jointly to the derivative of the pulse signal and the derivative of the inverted pulse signal, and arranged to provide at the output thereof a control signal for actuating said switching means to connect or disconnect the storage means and the coil.

7. A system for feeding energy according to claim 5, characterized by the fact that the connecting means comprise a delay circuit delivering a representation of said pulse signal but out of phase therewith, and "EXCLUSIVE-OR" gate means responsive jointly to the pulse signal and to said out of phase representation thereof providing as an output a signal for controlling said switching means for connecting and disconnecting the storage means.

8. A system for feeding energy according to any one of claims 5 to 7, characterized by the fact that the switching means comprise field-effect transistors.

9. A system for feeding energy according to any one of claims 5 to 7, characterized by the fact that the switching means coomprise two-pole transistors.

10. A system for feeding energy according to any one of claims 5 to 7, characterized by the fact that the storage means comprises a battery.

11. A system for feeding energy according to any one of claims 5 to 7, characterized by the fact that the storage means comprises condenser means.

* * * * *